Figure 1:
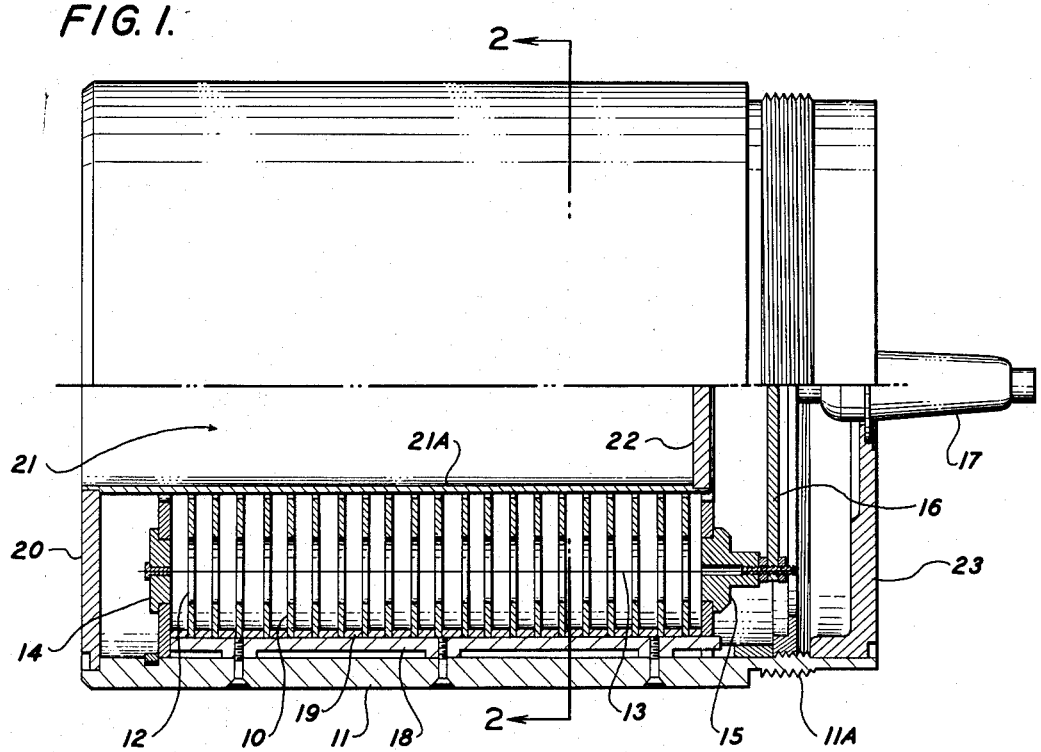

Feb. 21, 1956 W. M. STRATFORD ET AL 2,735,946
PROSPECTING
Filed Aug. 3, 1951

INVENTORS.
WILLIAM STRATFORD
CHARLES F. TEICHMANN
GERHARD HERZOG
BY Daniel Stryker
ATTORNEY United States Patent Office 2,735,946
Patented Feb. 21, 1956

2,735,946
PROSPECTING

William M. Stratford, New York, and Charles F. Teichmann, Fleetwood, N. Y., and Gerhard Herzog, Houston, Tex., assignors to The Texas Company, New York, N. Y., a corporation of Delaware Application August 3, 1951, Serial No. 240,182

6 Claims. (Cl. 250—83.6)

This invention is concerned with geophysical examinations and with prospecting for mineral deposits, particularly those of metallic ores. The invention provides improvements which facilitate the location of such deposits but is also useful for geological mapping purposes and bore hole logging. The invention is useful in the investigation of mineral samples removed from the original positions as well as for the investigation of rock formations in situ.

This application is a continuation-in-part of our co-pending application Serial No. 13,845, filed March 9, 1948 (now U. S. Patent No. 2,562,961.)

Radioactive substances are distributed throughout many of the rocks of the earth's crust in minute concentrations, but these concentrations are sufficient to permit measurement of radiation intensity and particularly the measurement of the intensity of alpha, beta and gamma rays.

Gamma radiation consists of electromagnetic waves identical in nature to very penetrating X-rays. It has been proposed heretofore to differentiate between mineral formations on the basis of the intensity of the gamma radiation emitted by them. However, different mineral formations sometimes emit gamma radiation of the same intensities, so that some other basis of differentiation is required. We have discovered that in many instances it is possible to distinguish between different formations which emit gamma radiation of the same intensity by measuring the intensity of beta or alpha radiation emitted by the respective formations and determining the ratio of the intensity of the gamma radiation to the intensity of beta or alpha radiation emitted or even by determining the ratio of the intensity of the alpha radiation to the beta radiation.

Some radioactive elements emit nothing but gamma rays. Others emit alpha radiation and beta radiation of various intensities. By way of example, a shale containing a high proportion of potassium may emit the same intensity of gamma radiation as a sandstone containing a small proportion of one of the heavy radioactive elements such as uranium. However, the sandstone will emit alpha or beta radiation of intensities that are distinguishable from the alpha or beta emissions of the shale, so that the ratio of intensities of gamma to alpha or beta emission or the ratio of intensities of alpha and beta serve to distinguish between the two.

As disclosed in co-pending application Serial No. 13,842, filed March 9, 1948, by Gerhard Herzog (now U. S. Patent No. 2,562,914), it has been discovered that many mineral bodies which may or may not be radioactive themselves are accompanied by detectable radioactive auras in the substantially barren country rocks in which they occur. The gamma radiation emitted by such auras may increase as the mineral deposit is approached, in which case a positive anomaly is present, or decrease as the mineral deposit is approached, in which case a negative anomaly is present. In some instances, however, the intensity of emitted gamma radiation remains substantially constant as the mineral deposit is approached, but the ratio of intensities of gamma to alpha or beta intensities or the ratio of alpha intensities to beta intensities may either increase or decrease. By determining the ratio of the intensities of at least two of these types of radiation at each of a series of spaced points, it is possible to determine the presence of either a positive anomaly or a negative anomaly. By way of example, such determinations may be made along a traverse across a known mineral deposit, and a characteristic anomaly in terms of variations in ratios of intensity determined. Similar determinations are then made along a traverse in the neighborhood of a suspected but unexposed deposit in the same general area. If the same form of anomaly appears, it may be taken as indicative of the existence and location of the suspected deposit.

Figure 2:
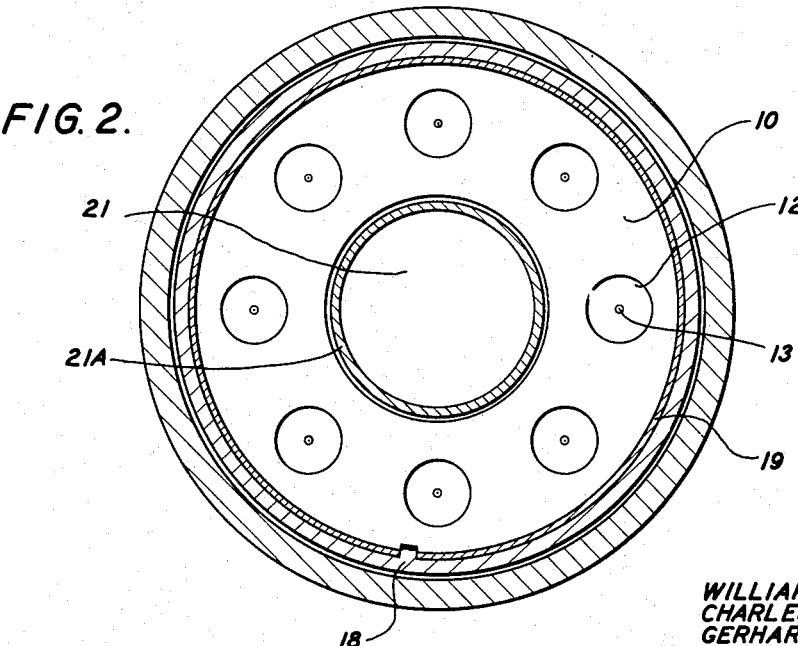

These and other aspects of the invention will be understood more thoroughly in the light of the following detailed description taken in conjunction with the accompanying drawings, in which:

Fig. 1 is an elevation, partly in section, of a preferred form of radiation detector for investigating samples in accordance with the invention; and Fig. 2 is a horizontal section taken through the apparatus of Fig. 1 along the line 2—2.

Figs. 1 and 2 show a toroidal or cup-shaped detector of high efficiency. It comprises a spaced stack of annular silver cathode plates 10 disposed in an annular envelope 11 and electrically connected together in parallel. The outer wall of the envelope is metallic and the cathodes are electrically connected to it. Each cathode plate has a series of symmetrically disposed holes 12, the holes in the several plates being in alignment to permit the passage through the plates of a plurality of tungsten anode wires 13. These wires are parallel to each other and perpendicular to the plates and are disposed respectively on the axes of the several rows of holes. The wires are stretched taut between insulators 14, 15 at their ends and are connected in parallel to each other to a common conductor 16 in plate form. A lead from this plate passes through an insulator bushing 17 and thence to a conventional counter circuit (not shown) including a D. C. high voltage supply, a preamplifier, an amplifier, a scale circuit and a recorder.

Each cathode plate is provided with a notch to aid in alignment of the holes in the plates and a rib 18 fastened to the outside wall of the envelope passes through the several notches and prevent the plates from turning within the envelope. Spacers 19 are disposed between the plate immediately inside the envelope to hold them apart in fixed relationship with each other, say on $3/16$ inch spacing.

The top of the annular envelope is closed by an annular plate 20 extending from the inside wall of the envelope to the outside wall of the envelope. The inside wall 21A is thin, so as to be transparent to beta rays and defines the side of a deep cylindrical cup 21 in which a sample to be investigated is placed. The bottom of the cup is defined by a plate 22. The bottom of the detector as a whole is closed by a cylindrical plate 23 through which the bushing 17 passes. The outside of the envelope is threaded in its lower portion so that the envelope may be screwed onto a container holding a pre-amplifier (see Fig. 2).

The entire envelope is gas tight and is filled with a suitable atmosphere, say a mixture of alcohol and argon.

In the operation of a high potential difference is established between the cathodes and anodes, this difference being nearly but not quite enough to cause a discharge to take place. If an ionizing ray passes into the detector a discharge may take place with resultant current flow which produces a "count." The discharge ceases after a short time after which the counter is again in condition to register ionizing rays.

The toroidal detector is particularly desirable for the practice of the invention employing several samples and involving the detection of gamma ray intensity, for a ray originating in a sample placed in its cup is much more likely to enter the active volume of the detector and be detected than if the sample were placed outside the counter. In short, the sample is substantially surrounded by active detector volume and hence the registered intensity of its radiation tends to be increased.

The counter just described responds to alpha, beta and gamma rays which enter its active volume, and has a higher counting efficiency for gamma rays than an ordinary Geiger-Mueller counter. The latter, however, and in fact any type of radiation detector that is responsive to any two of the types of radiation under investigation, may be employed.

To consider a typical underground survey conducted in accordance with the invention, say along a cross cut near which an unexposed ore body is suspected to occur, representative samples are taken at spaced intervals, say twenty feet, from the rock along one side of the cross cut. These samples should be sufficiently large to be representative. Samples of a kilogram or more are recommended. The individual samples are kept separate and each is crushed to the same maximum size and size distribution. Crushing to minus 10 mesh is desirable and even finer crushing may give better results. After the samples have been crushed a representative portion is selected for investigation in the counter. Samples of 100 grams are satisfactory although, generally speaking, the larger the sample the better. In any case, all the samples tested should have approximately the same mass. Conveniently the same volume of sample is taken each time and the weight of each sample is taken.

In carrying out measurements of radiation intensity in accordance with the invention it is essential to know the background count. Consequently, with the detector empty, the background is measured to discover its intensity, which varies sporadically within limits and may also vary with the time of day. This latter variation is known as the diurnal variation and should be measured by taking background intensities at intervals during the day. The background count should be checked frequently, at least once a day.

After the background has been established each sample in turn is placed in a container which is opaque to beta rays. The sample in the container is placed in the cup of the detector and left there until a fixed number of counts has been recorded, the time for this standard count being accurately determined in each case. When using a detector equipped with a scale of 16 scaler circuit, good results are obtained by taking 3200 counts for each sample. This procedure of taking a constant number of counts eliminates variations in statistical error. The appropriate background count for the observation and for the particular time of day is then subtracted in each case. The corrected count, i. e. the total count minus the background, is the gamma ray intensity for the particular sample.

The foregoing procedure is repeated for each sample.

The foregoing procedure is repeated, except that the sample is placed directly in the cup, the walls of which are transparent to beta radiation and gamma radiation. The result of this counting procedure is the sum of the beta radiation intensity and the gamma radiation intensity. To obtain the beta radiation intensity, the total reading for the previous gamma radiation intensity measurement for the particular sample is subtracted.

The ratio of beta radiation intensity to gamma radiation intensity is then calculated for each sample and these ratios are plotted along the course of the survey.

In practice, it is desirable to make a survey across a known ore body to determine what if any anomalies measured in terms of the ratio of gamma ray intensity to beta ray intensity are detected in the neighborhood of the body. This gives an index for the location of similar anomalies associated with buried ore deposits in the same vicinity. Once this index is established, surveys are made in the vicinity of suspected deposits in an effort to locate a radioactive aura associated with an unexposed deposit.

Samples taken in the practice of the instant invention may emit alpha rays in addition to beta and gamma rays. Alpha rays have very little penetrating power, and special provisions are necessary to assure that they enter the counter. The inside wall of the envelope of the toroidal detector of Figs. 1 and 2 may be made very thin so as to be transparent to alpha radiation. Such thin walls or windows require that the pressure of the gas within the envelope be the same as the pressure outside the envelope or that the window be reinforced. Relative intensities emitted by alpha rays in samples are found by placing the sample directly in the cup of the thin walled detector and determining the count as described previously. Thereafter a shield which cuts out alpha rays but is transparent to beta and gamma rays is placed in the cup, as for example, by placing the sample in a container such as a glass test tube which has a wall thickness that will stop alpha rays but will permit beta and gamma rays to enter the counter. The count is determined under these conditions. Then the sample may be transferred to a second container which has a wall so thick that it stops both alpha and beta rays while permitting gamma rays to enter the counter. Another count is obtained in the counter under these conditions. The background is subtracted and the intensities of alpha, beta and gamma rays are determined as previously described. Thus alpha intensity is determined by subtracting the second count from the first. Beta intensity is obtained by subtracting the third count from the second and the third count minus the background gives the gamma intensity.

In summary, the process may be conducted in three stages. In the first stage the counter is made transparent to alpha, beta, and gamma rays. In the second stage wall thickness is increased to eliminate alpha while permitting beta and gamma rays to enter. In the third stage the wall is transparent only to gamma rays.

When dealing with samples, an alternative method for determining alpha intensity involves the investigation of radioactive gases (i. e. radon, actinon or thoron) emitted by the sample. To determine the intensity of alpha rays emitted, for example by radon, the sample obtained in the exploration is crushed and gas is extracted from the sample. This gas may be flushed directly into the detector itself, for example by a stream of say argon and alcohol. In this way the alpha rays are emitted within the envelope and the problem of penetration is effectively solved.

After the radioactive gas has been extracted from the sample the latter is subjected to further tests in the toroidal detector employing first a wall which is transparent to beta and gamma rays and thereafter a wall which is transparent only to gamma rays.

In some cases, the pertinent ratio may be between alpha or beta and gamma and in other cases between alpha and beta. In all such cases the ratios of intensity are determined and plotted along the course of the survey. In the case of a surface mapping operation, lines of equal ratio are drawn on a map after the fashion of contours to aid in interpretation of results. In the case of a traverse, say along a mine working or a well bore the ratios are plotted along the traverse.

The practice of the invention does not require that the samples be severed and measured in a cup-shaped detector as described previously, although this is the preferred practice because of the difficulty of handling a detector which is transparent to alpha and beta rays in the field and because of the low penetrating power of the alpha and beta radiation. However, it is within the concept of the invention to take the detector to the rock rather than taking the rock to the detector. In such a case a high efficiency detector for alpha, beta and gamma rays may be carried along a traverse. In one phase of the operation the detector is shielded to prevent the entry of alpha and beta radiation, so that gamma radiation alone is detected. In the next phase of the operation the detector is shielded against alpha radiation but not against beta and gamma radiation. In an optional third phase of the operation the detector is unshielded against alpha, beta or gamma radiation. Thus the detector may be set up at various observation points along a traverse under ground in a mine, or on the surface, or even drawn along a well bore. The ratios of intensity of gamma radiation to alpha or beta radiation or both, or the ratio of beta intensity to alpha intensity is determined in this type of operation just as previously described.

To eliminate differences in efficiency, etc., between different detectors, it is desirable to employ the same detector for all determinations of gamma radiation made in a given survey.

The toroidal detector of Figs. 1 and 2 is particularly useful in the practice of the invention when the intensity of gamma radiation from severed samples is determined. It has a high efficiency in gamma ray detection; it is rugged; its efficiency remains substantially constant over a wide temperature range; and (as previously indicated) its shape is such that the sample is substantially surrounded by active volume so that there is increased opportunity to "catch" emitted gamma rays. For investigations of the intensities of gamma rays emitted from rock in situ, say along a drill hole, a similar detector of non-toroidal form—say that described and claimed in U. S. Patent No. 2,397,071, is particularly suitable because of its high detection efficiency for gamma rays, its temperature stability and general ruggedness.

When dealing with alpha and beta radiation, however, different considerations apply, for the problem is not so much one of detection efficiency as it is one of assuring that the alpha and beta radiation actually reach the detector. As noted above, one way of assuring that alpha radiation actually reaches the active detector volume is to flush radioactive gases into a detector, which may be of the multiple plate and wire type or simply a conventional Geiger-Mueller counter. When dealing with beta rays, the problem is also relatively simple, for a conventional Geiger-Mueller counter is substantially 100% sensitive to beta radiation entering the active counter volume, although some of the beta radiation will be absorbed by the sample itself if its thickness is too great or by the counter wall if this is excessively thick. By avoiding the latter two situations, high detection efficiency for beta rays may be assured.

It is not always advantageous or necessary to measure beta ray intensity by measuring gamma ray intensity alone, and the sum of beta and gamma intensity, and determining beta ray intensity by difference. A conventional pulse-type counter of the Geiger-Mueller variety has a very low detection efficiency for gamma radiation, and if its wall thickness is such as to exclude alpha radiation and admit substantially all beta radiation, the registered intensity of the counter, in many cases, may be considered for practical purposes as that due to beta radiation alone. Hence, in one phase of the invention, gamma radiation is measured alone with a detector having a high efficiency for gamma radiation and protected with a shield to keep out beta and alpha radiation. Suitable detectors for this purpose include scintillation-type counters, crystal type detectors and the multiple plate and wire types already referred to. The gamma ray intensity thus determined is compared with the radiation intensity from the same source or sources with a conventional Geiger-Mueller counter having an envelope transparent to beta rays and opaque to alphas.

We claim:

1. In geophysical examinations, the improvement which comprises measuring the respective intensities of at least two of the three types of radiation consisting of alpha, beta, and gamma radiation emitted naturally by each of a series of different earth masses spaced from each other across a known mineral deposit, and determining the ratio of intensity of the different types of radiation for each of said masses, and thereby determining a characteristic anomaly for the known mineral deposit in terms of variations in ratios of intensities determined for the several different earth masses, measuring the respective intensities of the same types of radiation emitted naturally by each of a second series of different earth masses spaced from each other along a traverse in the neighborhood of a suspected but unexposed mineral deposit in the same general area as the known deposit and determining the ratios of intensity of said types of radiation for each of said masses along said traverse to determine whether an anomaly similar to that characteristic of the known deposit is associated with the earth masses along the traverse of the suspected deposit.

2. Process according to claim 1 in which the measurements are made with the earth masses in situ.

3. Process according to claim 1 in which the measurements are made from severed samples of the respective masses.

4. Process according to claim 1 in which the same radiation detector is employed for all the intensity measurements.

5. Process according to claim 1 in which the intensities of gamma radiation detected from each of the masses of both series are substantially the same.

6. In geophysical examinations according to claim 1, the improvement which comprises measuring the intensity of radiation from each of a series of earth masses with a detector sensitive to alpha, beta and gamma radiation and having a high detection efficiency for alpha, beta and gamma radiation and shielded from alpha and beta radiation, measuring the intensity of the radiation from each of the series of earth masses with a detector of conventional Geiger-Mueller type and sensitive to alpha, beta and gamma rays and having a low detection efficiency for gamma radiation and a high detection efficiency for alpha and beta radiation and shielded from alpha radiation, and determining the ratios of intensities obtained by the two types of measurements thus made for each of said masses.

References Cited in the file of this patent

UNITED STATES PATENTS

| | | |
|---|---|---|
| 2,340,967 | Langer | Feb. 8, 1944 |
| 2,349,753 | Pontecorvo | May 23, 1944 |
| 2,368,486 | Mullane | Jan. 30, 1945 |
| 2,374,197 | Hare | Apr. 24, 1945 |
| 2,469,463 | Russell | May 10, 1949 |
| 2,500,941 | Friedman | Mar. 21, 1950 |
| 2,508,772 | Pontecorvo | May 23, 1950 |